United States Patent
Lin et al.

(10) Patent No.: US 8,350,981 B2
(45) Date of Patent: Jan. 8, 2013

(54) FIXTURE COMPONENT FOR LIQUID CRYSTAL DISPLAY, LIQUID CRYSTAL DISPLAY ASSEMBLY AND LCD FIXTURE STRUCTURE FOR LIQUID CRYSTAL DISPLAY

(75) Inventors: Cheng-Hsuan Lin, Taipei (TW); Yung-Feng Lin, Taipei (TW); Mei-Hui Chen, Taipei (TW)

(73) Assignee: Wistron Corp., Hsichih, Taipei County (TW)

( * ) Notice: Subject to any disclaimer, the term of this patent is extended or adjusted under 35 U.S.C. 154(b) by 303 days.

(21) Appl. No.: 12/650,415

(22) Filed: Dec. 30, 2009

(65) Prior Publication Data
US 2011/0037919 A1   Feb. 17, 2011

(30) Foreign Application Priority Data
Aug. 11, 2009  (TW) ................................ 98214775 U (51) Int. Cl.
*G02F 1/1333*  (2006.01)

(52) U.S. Cl. ......................................................... 349/58
(58) Field of Classification Search ...................... 349/58
See application file for complete search history.

(56) References Cited

U.S. PATENT DOCUMENTS

| 2002/0003595 A1* | 1/2002 | Yazawa | 349/65 |
| 2011/0255036 A1* | 10/2011 | Aaltonen | 349/96 |

* cited by examiner

*Primary Examiner* — Timothy L Rude
(74) *Attorney, Agent, or Firm* — Muncy, Geissler, Olds & Lowe, PLLC (57) ABSTRACT

A fixture component for a liquid crystal display (LCD) module (LCD) is provided. The fixture component clamps and encloses the LCD module with a front cover and an enclosing member to clamp and wrap the LCD module, so as to form an LCD assembly. A visible portion is formed on a front side surface of the front cover in a protrusive manner, corresponding to a display side of the LCD module. The visible portion enhances the antistatic property of the LCD module. Meanwhile, the visible portion fits an opening of a case, so that the LCD assembly is mounted and fixed in the case more easily.

17 Claims, 14 Drawing Sheets

FIXTURE COMPONENT FOR LIQUID CRYSTAL DISPLAY, LIQUID CRYSTAL DISPLAY ASSEMBLY AND LCD FIXTURE STRUCTURE FOR LIQUID CRYSTAL DISPLAY

CROSS-REFERENCES TO RELATED APPLICATIONS

This non-provisional application claims priority under 35 U.S.C. §119(a) on Patent Application No. 98214775 filed in Taiwan, R.O.C. on Aug. 11, 2009, the entire contents of which are hereby incorporated by reference.

BACKGROUND OF THE INVENTION

1. Technical Field

The present invention relates to the fixing and fixing operations of a liquid crystal display (LCD) module, and more particularly to a fixture component for an LCD module, an LCD assembly, and a fixture structure for an LCD module.

2. Related Art

When a liquid crystal display (LCD) module is fixed in a case, a fixture structure is required to be designed according to the geometry factors of the LCD module, and the arrangement a cable connected the LCD module and a circuit of the electronic device has to be considered. In the process of fixing the LCD module in the case, the LCD module is firstly placed on a fixing frame, a transparent protection plate is fixed at an opening of the case, the LCD module is then placed on the protection plate, and finally the LCD module is fixed to the case by the fixing frame. Meanwhile, the cable of the LCD module has to pass through some through holes and be connected to the circuit, so that the entire fixing process is rather complex. Furthermore, the LCD module is not equipped with any obvious positioning mark, so that the LCD module is sometimes fixed in an incorrect direction in the fixing process. Furthermore, when the LCD module is applied to a different case, the fixture structures inside the cases has to be re-designed even if the same LCD module is used, and no universal fixture structure can be adopted.

When considering the electrostatic discharge (ESD) protection of the LCD module, an electrostatic path has to be considered, thus the design of the case is continuously modified accordingly. The so-called electrostatic path refers to a path from an edge of the opening of the case to the LCD module. The longer the path is, the lower the potential of the electrostatic charges after being conducted from a surface of the case to the LCD module will be. Since the LCD module itself generally has limited antistatic property, the electrostatic path must be utilized to further improve the overall antistatic property.

Figure 1:
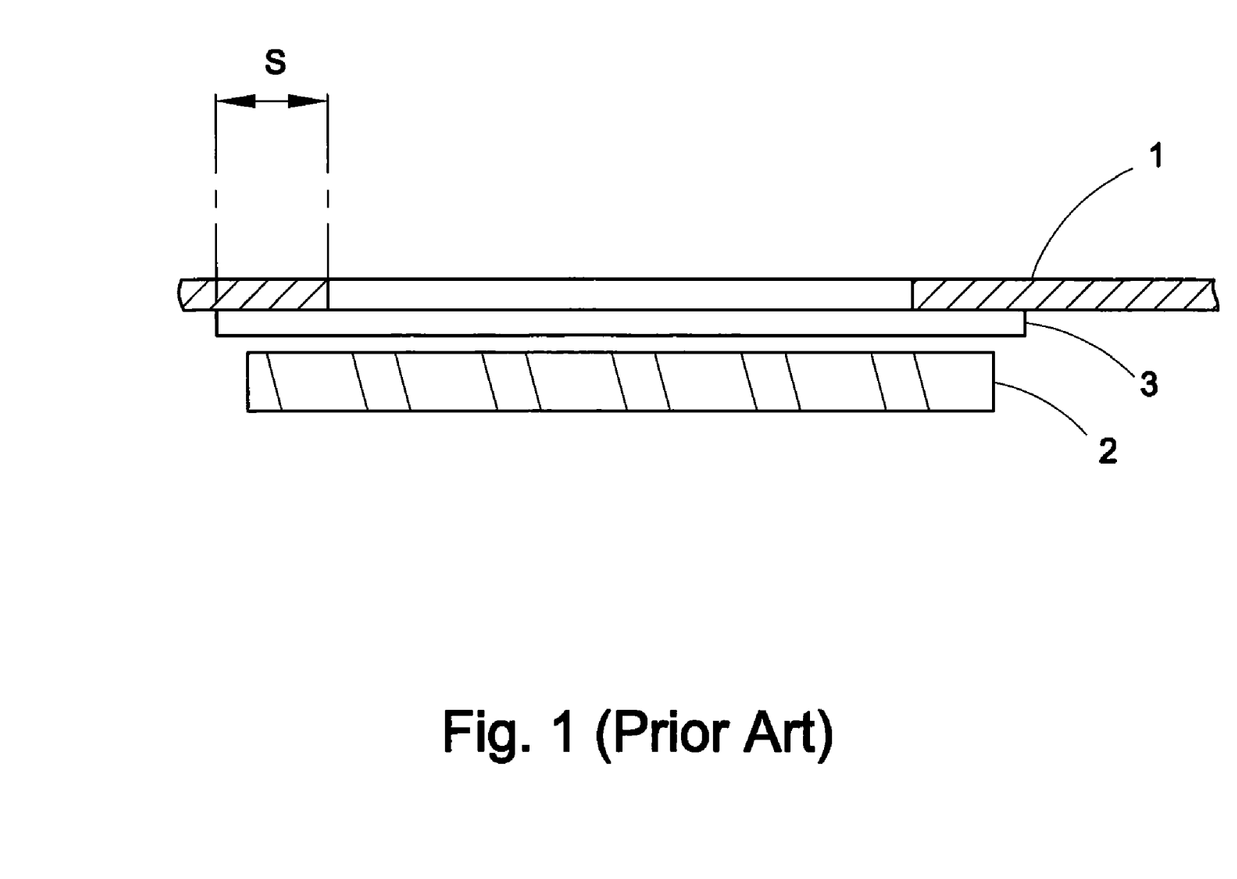
FIG. 1 is a cross-sectional view of a protection plate, a case, and an liquid crystal display (LCD) module in the prior art.
Figure 2:
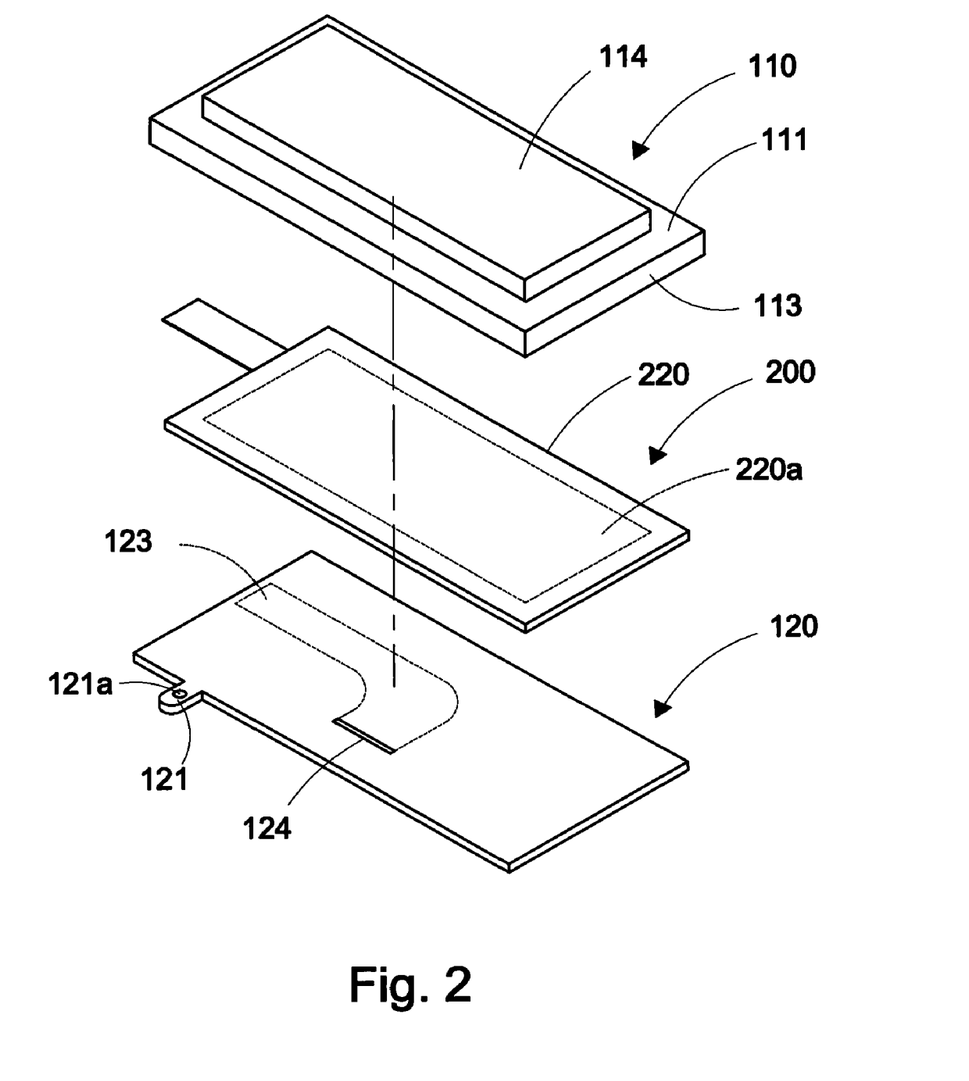
FIGS. 2 and 3 are exploded views of a first embodiment of the present invention.
Figure 3:
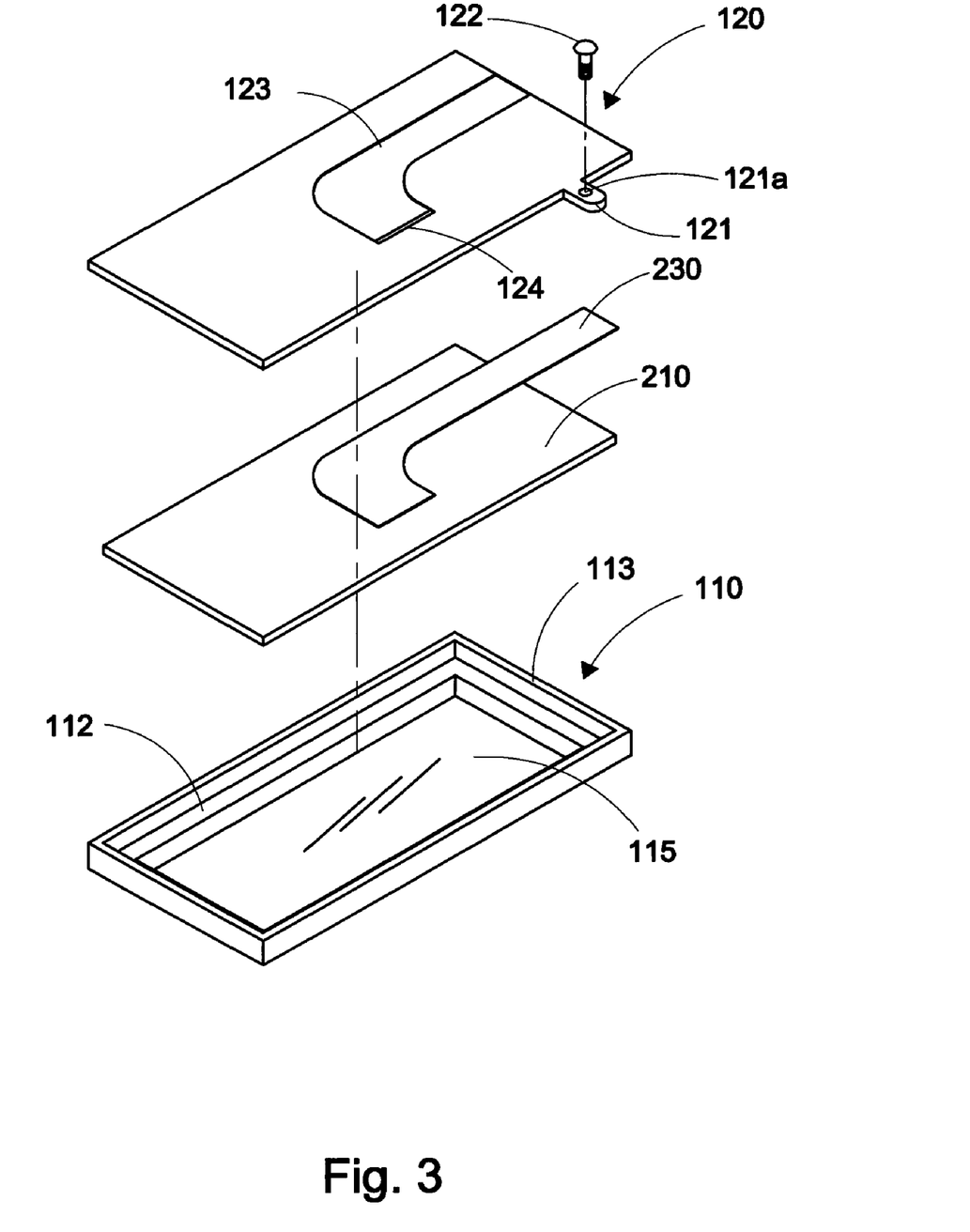
Figure 4:
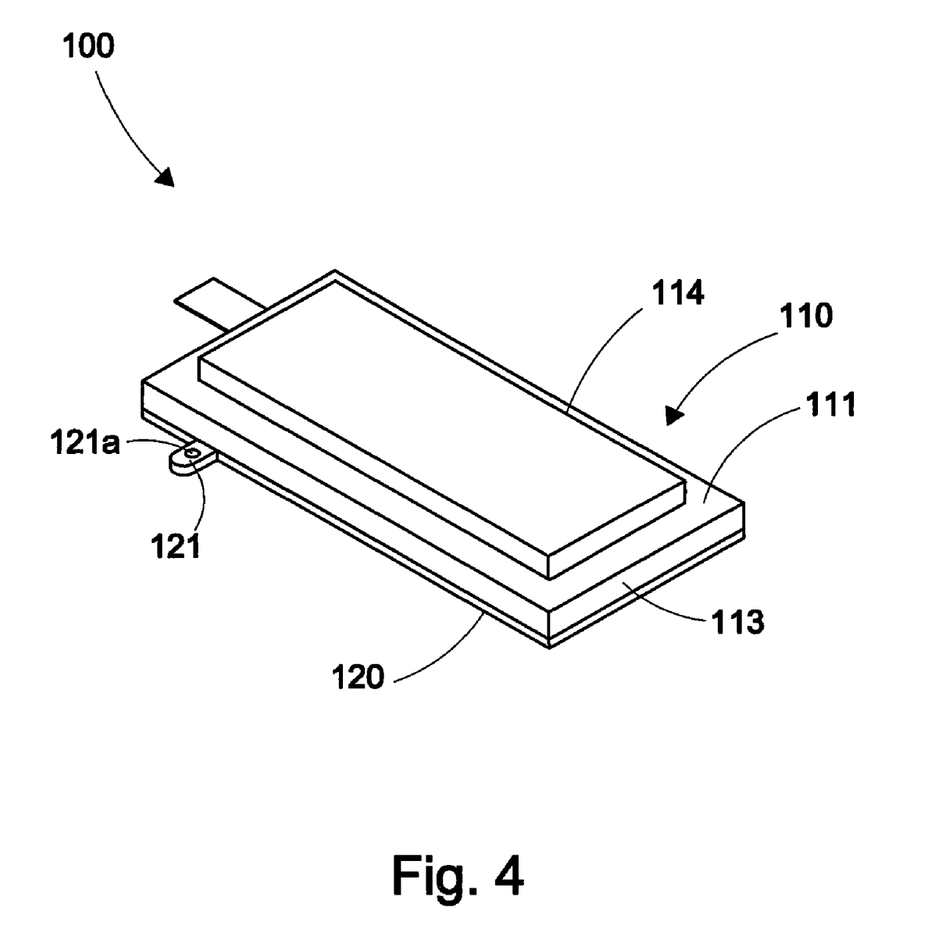
FIGS. 4 and 5 are perspective views of the first embodiment of the present invention.
Figure 5:
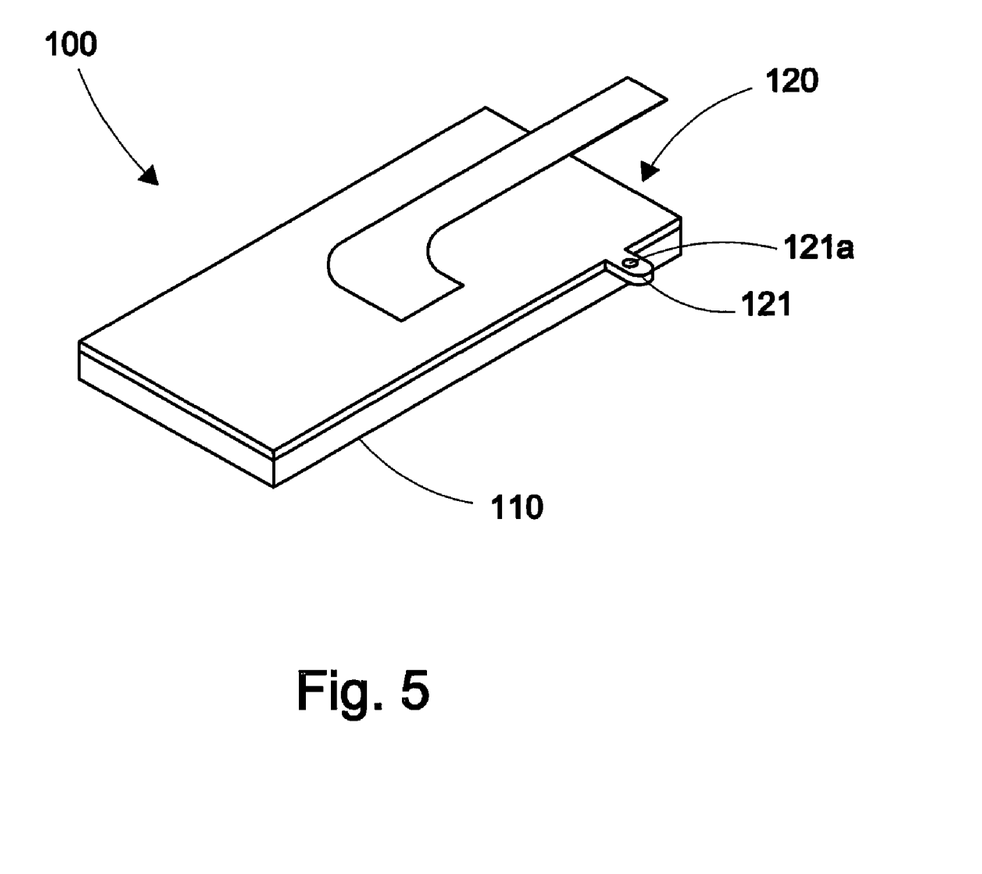

FIG. 1 is a cross-sectional view of a case 1 and an LCD module 2, which is used for illustrating an electrostatic path. The electrostatic potential is at the highest level on an outer surface of the case 1, and then the potential on a surface of the insulator decreases as the length of the path increases. Theoretically, if the length of the path increases by each 1 millimeter, the potential decreases by 1 kV accordingly. After the electrostatic charges enter the case 1, the electrostatic charges are physically blocked by a protection plate 3, so that the electrostatic charges are conducted along a surface of the protection plate 3 for a certain distance before reaching the LCD module 2. Such a distance is referred to as an electrostatic path S. The better the antistatic property required, the longer the electrostatic path S will be, and accordingly the larger the protection plate 3, which in turn occupies a larger space inside the case 1. As a result, an indicator or a push button originally disposed at a periphery of the LCD module 2 must be placed at a large distance from the LCD module 2.

SUMMARY

In the prior art, the process of fixing a liquid crystal display (LCD) module in a case is rather complex and error-prone. Furthermore, the fixture structure in the prior art provides poor ESD protection, and the design for antistatic property must be utilized by occupying the space inside the case.

In view of the above problems, the present invention is directed to a fixture component for a LCD module, which simplifies the fixing process of an LCD module, and effectively improves the antistatic property.

To solve the above problems, in one or more embodiments, the present invention provides fixture component, which is used for fixing an LCD module therein. The fixture component includes a front cover and an enclosing member. The front cover has a front side surface and a rear side surface. A protruding visible portion is formed on the front side surface in a protrusive manner, and at least the part of the front cover forming the visible portion is transparent. The enclosing member is combined with the front cover, and a clamping space is defined between the enclosing member and the front cover.

In one or more embodiments, the present invention further provides an LCD assembly, which includes an LCD module and the above-mentioned fixture component. The LCD module has a back side and a display side. The enclosing member is combined with the front cover to clamp and wrap the LCD module between the front cover and the enclosing member. The display side of the LCD module faces the rear side surface, such that the display side and the front side surface face the same direction, and the visible portion corresponds to the display side.

In one or more embodiments, the present invention further provides a fixture structure, which includes a case and the above LCD assembly. The case has an opening, and the LCD assembly is fixed in the case, such that the visible portion is located in the opening, thereby assembling the LCD panel rapidly.

According to the present invention, an LCD assembly as a single module is utilized by combining a fixture component with an LCD module. The LCD assembly can be rapidly fixed in a case, thereby reducing errors which may occur during assembly. Meanwhile, when the LCD assembly is combined with the case to form a fixture structure, the antistatic property is enhanced effectively.

DETAILED DESCRIPTION

Referring to FIGS. 2, 3, 4, and 5, a fixture component for fixing a liquid crystal display (LCD) module 200 according to a first embodiment of the present invention is shown, in which the LCD module 200 has a back side 210, a display side 220, and a cable 230. The cable 230 is disposed on the back side 210.

Referring to FIGS. 2 to 5, the fixture component includes a front cover 110 and an enclosing member 120. The front cover 110 is combined with the enclosing member 120, such that the LCD module 200 is disposed between the front cover 110 and the enclosing member 120.

The front cover 110 has a front side surface 111, a rear side surface 112, and a lateral wall 113. A visible portion 114 is formed on the front side surface 111 in a protrusive manner, and a recessed space 115 corresponding to the visible portion 114 is formed on the rear side surface 112. The front cover 110 is made of a transparent material, such that the entire front cover 110 or at least the part of the front cover 110 forming the visible portion 114 is transparent.

Referring to FIGS. 2 to 5, the display side 220 of the LCD module 200 faces the rear side surface 112, such that the display side 220 and the front side surface 111 face the same direction. A main display area 220*a* of the display side 220 corresponds to the visible portion 114, which allows a user to view information displayed on the display side 220 through the visible portion 114. The lateral wall 113 is formed at an edge of the rear side surface 112 for wrapping an edge of the LCD module 200, such that the two-dimensional movement of the LCD module 200 is limited by the lateral wall 113, that is, the LCD module 200 will not slide on the rear side surface 112.

The enclosing member 120 is combined with the front cover 110, and a clamping space is defined between the enclosing member 120 and the front cover 110. The enclosing member 120 is used for covering the back side 210 of the LCD module 200, so as to clamp and wrap the LCD module 200 between the front cover 110 and the enclosing member 120. The front cover 110 and the enclosing member 120 are made of insulating material, so as to prevent the LCD module 200 from being directly affected by external electrostatic charges.

Furthermore, the enclosing member 120 is preferably made of rigid material, so as to provide the rigid support effects, thereby protecting the LCD module 200 from being damaged when the back side 210 of the LCD module 200 suffers from mechanical impact. However, the material of the enclosing member is not limited to the rigid material, and may also be a flexible material, such as a plastic film, a rubber film, or an adhesive tape.

Furthermore, when the enclosing member 120 is made of the rigid material, the enclosing member 120 further has one or more lugs 121 extending from an edge thereof. Each lug 121 has a fixing hole 121 for a fixing member 122. The fixing member can be a passing through the fixing hole, thereby fixing the fixture component at a predetermined position.

Referring to FIGS. 2 to 5, a liquid crystal display (LCD) assembly 100 is also provided according to the first embodiment of the present invention, the LCD assembly 100 includes an LCD module 200 and the above-mentioned fixture component. The LCD module 200 is clamped and wrapped between the front cover 110 and the enclosing member 120 of the fixture component. The visible portion 114 of the front cover 110 corresponds to the display side 220 of the LCD module 200, which allows a user to view information displayed on the display side through the visible portion 114. A cable groove 123 for accommodating a cable 230 is formed on an outer side surface of the enclosing member 120, and the enclosing member 120 has a cable hole 124 for the cable 230 to pass through, so as to receive a driving signal of the LCD module 200.

The LCD assembly 100 is formed by combining the above-mentioned fixture component and the LCD module 200, therefore the LCD assembly 100 is a single module. As a single module, the subsequent fixing process of the LCD module 200 is simplified. The fixture component provides desirable protection, thereby prevents the LCD module 200 from being damaged during delivery.

Figure 6:
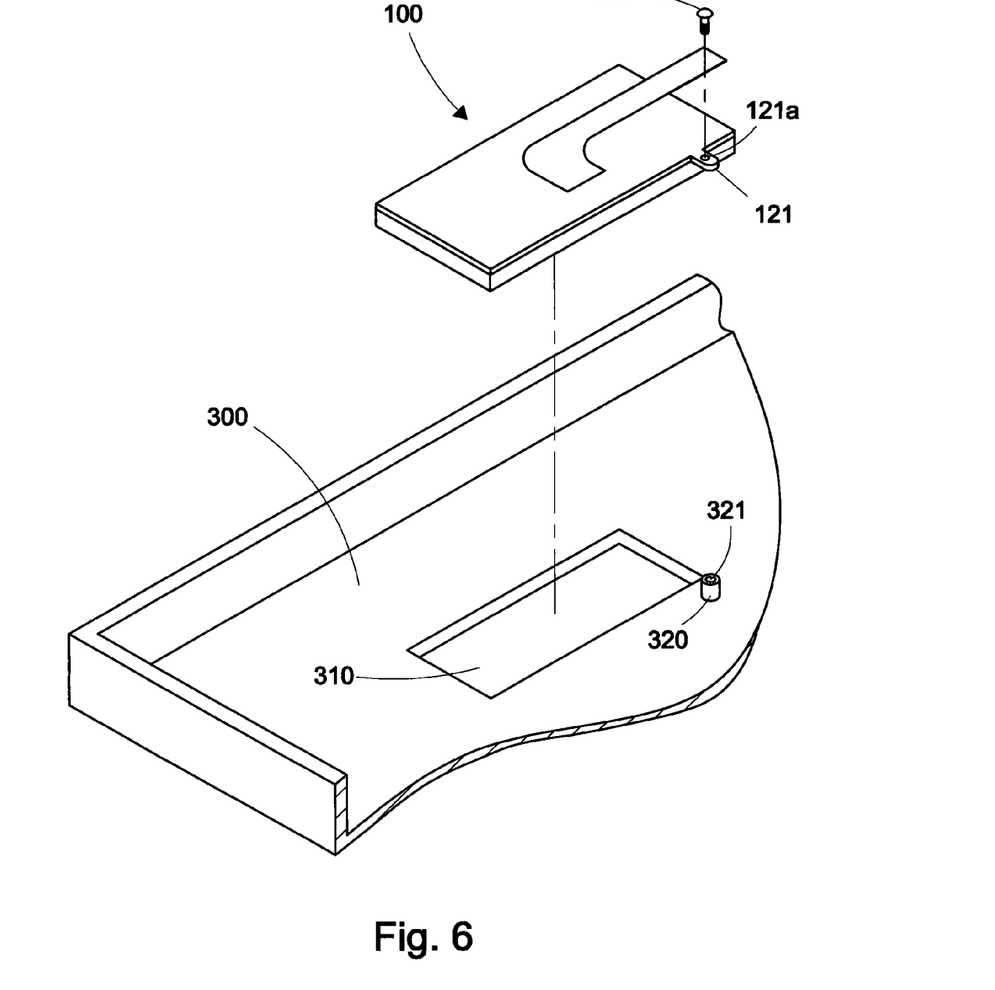
FIG. 6 is a perspective view of an LCD assembly and a case according to the first embodiment of the present invention, in which the LCD assembly is separated from the case.
Figure 7:
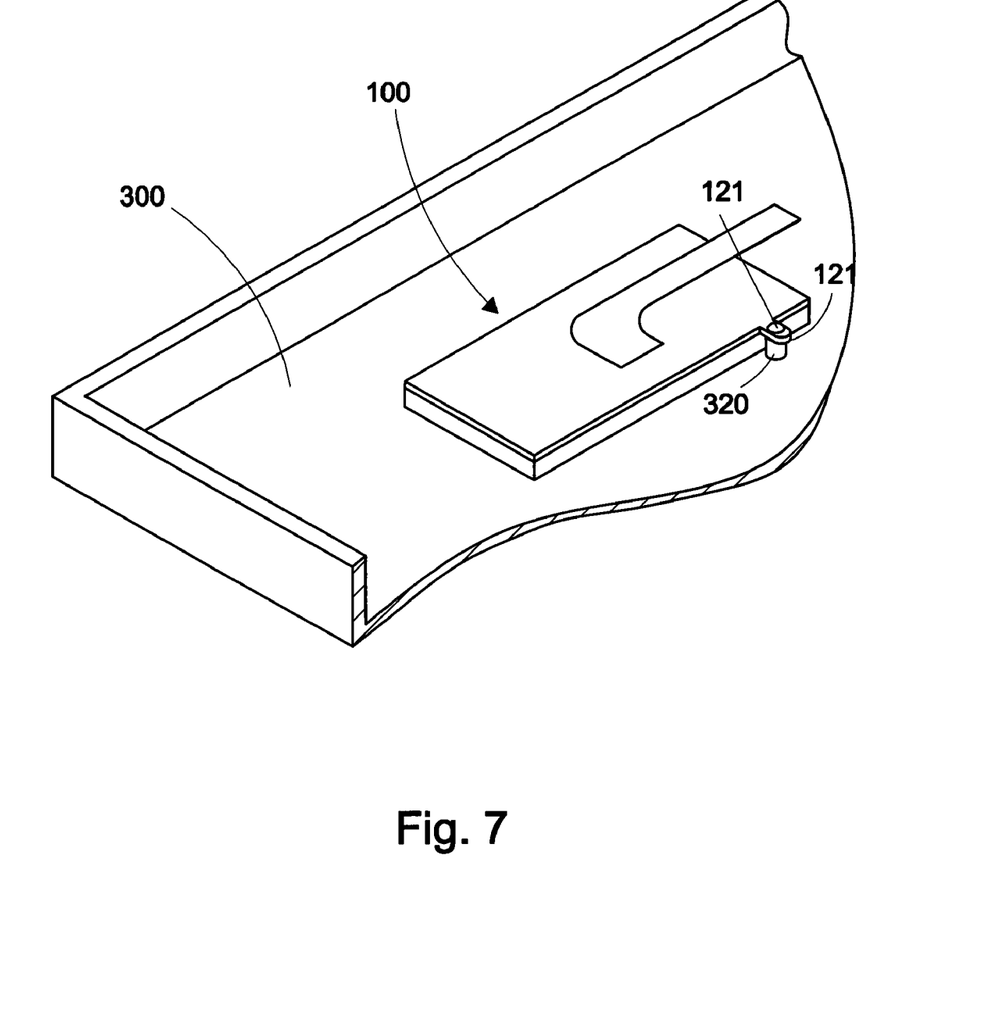
FIG. 7 is a perspective view of the LCD assembly and the case according to the first embodiment of the present invention, in which the LCD assembly is combined with the case.
Figure 8:
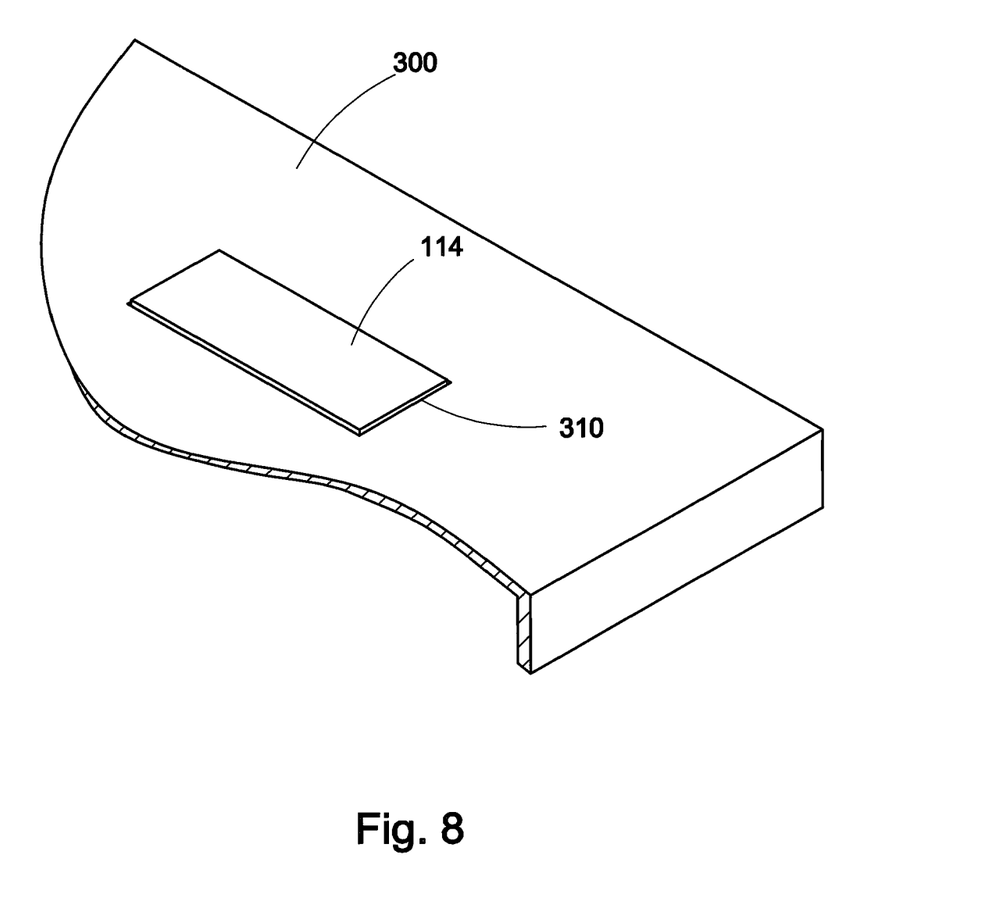
FIG. 8 is a perspective view from another viewing angle of the LCD assembly and the case according to the first embodiment of the present invention.

Referring to FIGS. 6, 7, and 8, a fixture structure for the LCD module 200 is also provided according to the first embodiment of the present invention. The fixture structure includes a case 300 and an LCD assembly 100. The case 300 has an opening 310. The LCD assembly 100 is disposed on an inner side surface of the case 300, and the visible portion 114 is located in the opening 310. A fixing post 320 is disposed on the inner side surface of the case 300, and the fixing post 320 has a fixing hole 321. The fixing member 122 firstly passes through a through hole 121*a* of the lug 121, and then is inserted into and fixed to the fixing hole 321 of the fixing post 320, thereby fixing the LCD assembly 100 in the case 300. Furthermore, the fixing post 320 and the lug 121 may further achieve a positioning effect, and specifically, by aligning the lug 121 with the fixing post 320, it can be ensured that the LCD assembly 100 is assembled into the case 300 in a correct direction, thereby reducing the errors that may occur during assembly. The fixture component has a simple appearance and fixed parameters such as a size of the visible area and a size of the front cover. Therefore, the matching fixture structure inside the case can be designed with universal design parameters, so that the design process of the fixture structure can be simplified.

Figure 9:
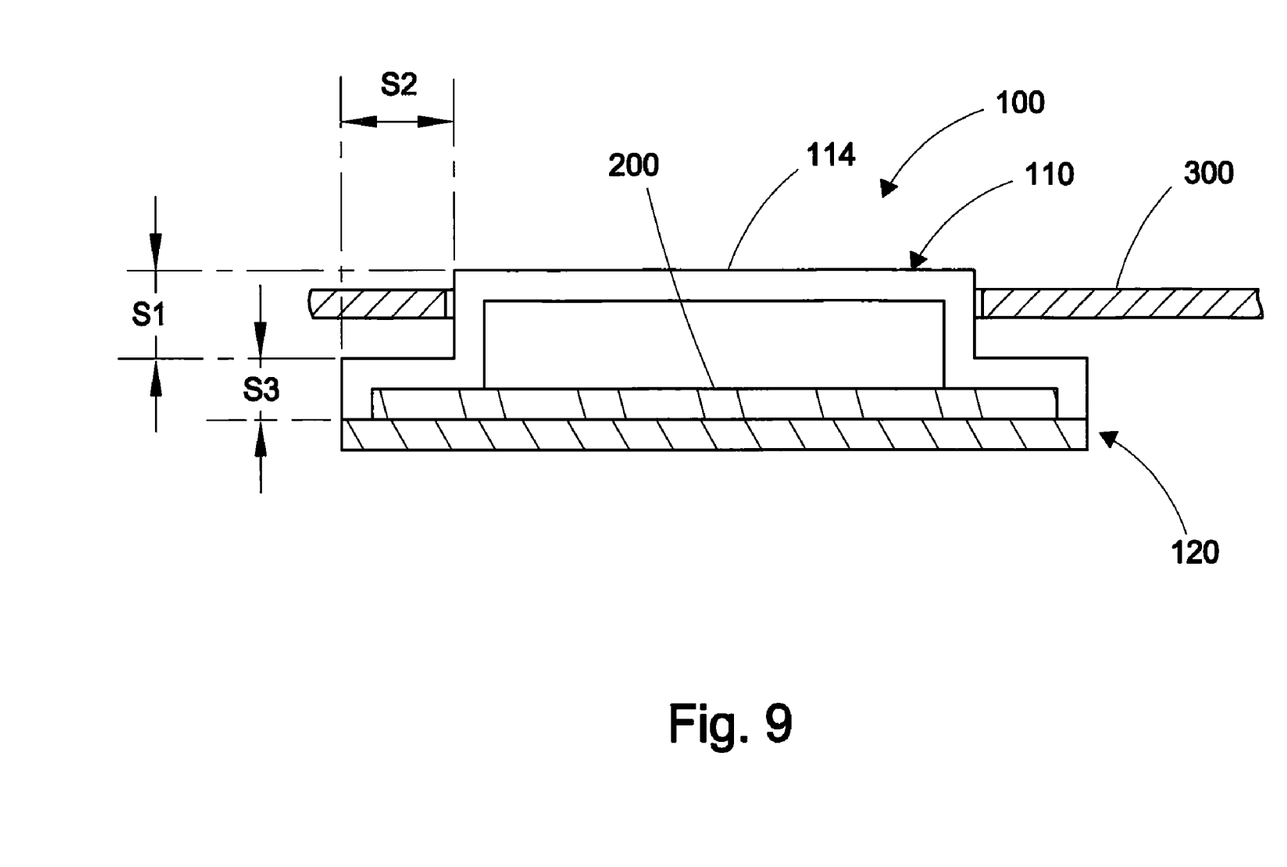
FIG. 9 is a cross-sectional view of the case and the LCD assembly according to the first embodiment of the present invention.

FIG. 9 is a cross-sectional view of the LCD module fixture structure. An electronic device with the case 300 may be affected by external electrostatic charges in usage. The electrostatic potential is at the highest level on an outer surface of the case 300, and the potential on a surface of the insulator decreases as the length of the path increases. Theoretically, if the length of the path increases by each 1 millimeter, the potential decreases by 1 kV accordingly. In the present invention, the electrostatic charges that cause the most severe influence on the LCD module 200 enter through a slit between the opening 310 and the visible portion 114.

After entering through the slit, the electrostatic charges travel through a first electrostatic path S1 that is a height difference between the visible portion 114 and the front side surface 111, followed by a second electrostatic path S2 from a base portion of the visible portion 114 to an edge of the front side surface 111. When the lateral wall 113 is monolithically formed on the front cover 110, surrounds an edge of the rear side surface 112, and surrounds and wraps an edge of the LCD module, a third electrostatic path S3 is formed. The electrostatic charges has to pass through the first electrostatic path S1 and the second electrostatic path S2, and in some cases, the electrostatic charges has to further pass through the third electrostatic path S3. Compared with the assembly of the LCD module in the prior art (referring to FIG. 1), the length of the path for the electrostatic charges from the surface of the case to the LCD module is at least increased by the first electrostatic path S1, that is, the height difference between the visible portion 114 and the front side surface 111. The length of the path for the electrostatic charges from the surface of the case 300 to the LCD module 200 is therefore properly increased due to the existence of the first electrostatic path S1, thereby improving the antistatic property of the LCD assembly 100. Meanwhile, after the first electrostatic path S1 is additionally provided, the second electrostatic path S2 may be shortened, that is, the area of the front cover 110 (the front side surface 111), may be reduced, thereby reducing the space occupied by the LCD assembly 100 on the inner side surface of the case 300. Therefore, other elements such as a push button or an indicator of the electronic device may be disposed closer to the LCD module 200.

Figure 10:
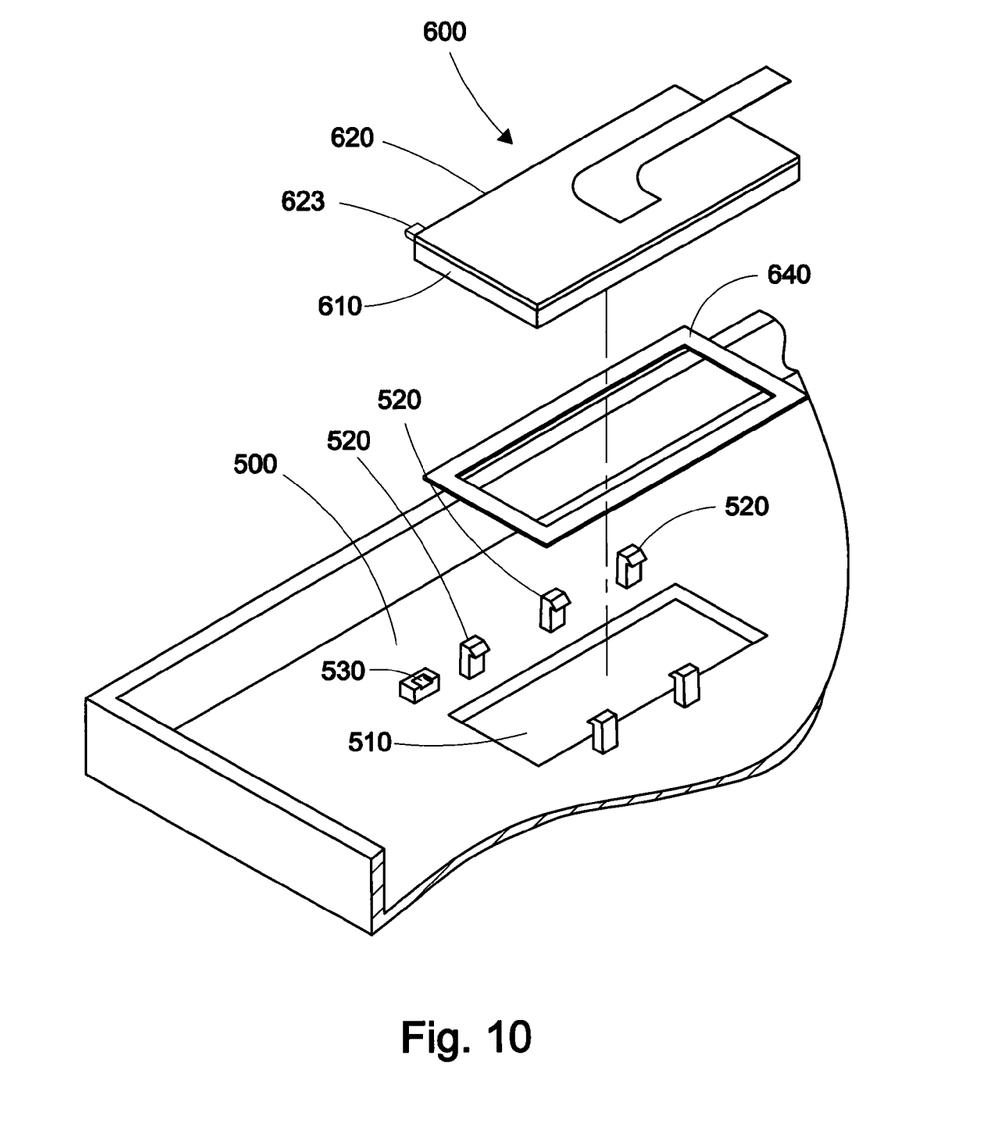
FIG. 10 is a perspective view of an LCD assembly and a case according to a second embodiment of the present invention, in which the LCD assembly is separated from the case.
Figure 11:
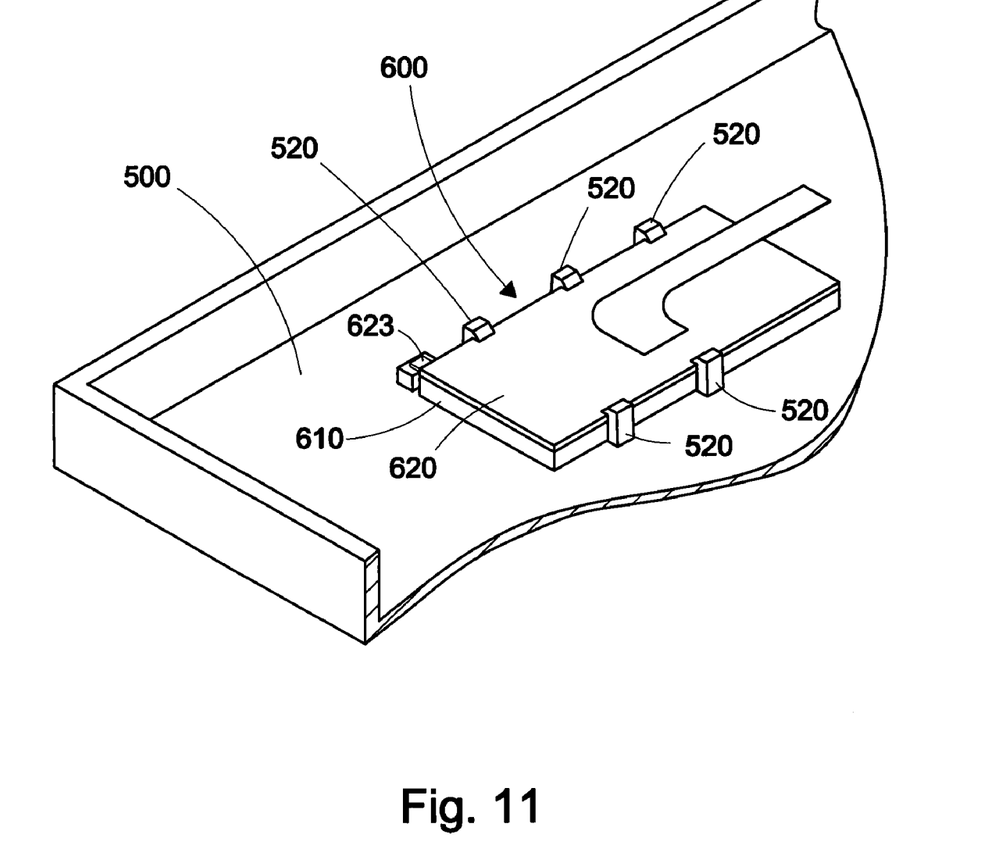
FIG. 11 is a perspective view of the LCD assembly and the case according to the second embodiment of the present invention, in which the LCD assembly is combined with the case.

Referring to FIGS. 10 and 11, a fixture structure according to a second embodiment of the present invention is shown. The fixture structure includes a case 500 and an LCD assembly 600.

The case 500 has an opening 510. A plurality of hooks 520 and one or more positioning grooves 530 are disposed on an inner side surface of the case 500. The hooks 520 and the positioning grooves 530 are located at an edge of the opening 510.

The LCD assembly 600 includes a fixture component and an LCD module disposed in the fixture component. An enclosing member 620 of the fixture component further includes a positioning member 623 disposed at an edge of the enclosing member 620.

The LCD assembly 600 is disposed on the inner side surface of the case 500, such that a visible portion 614 of a front cover 610 is located in the opening 510. The hooks 520 are used for fixing the enclosing member 620, so as to fix the LCD assembly 600 in the case 500. The positioning member 623 is inserted into the positioning groove 530, so as to ensure that the LCD assembly 600 is assembled into the case 500 in a correct direction, thereby reducing the errors that may occur during assembly.

Figure 12:
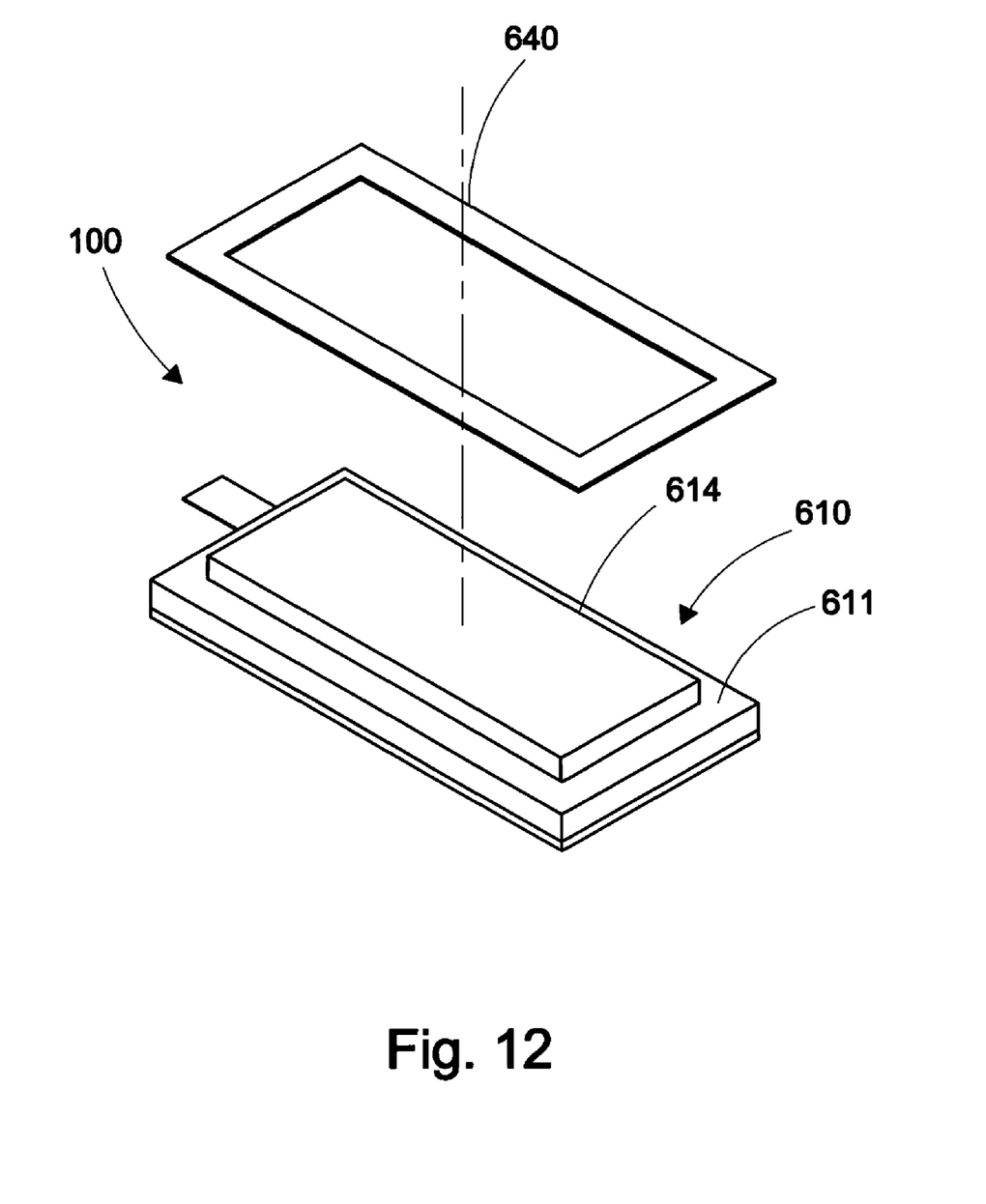
FIG. 12 is a perspective view of a third embodiment of the present invention.

Referring to FIGS. 10 and 12, the LCD assembly 600 further includes a flexible pad 640 disposed on a front side surface 611 and surrounding the visible portion 614. The flexible pad 640 is clamped between the inner side surface of the case 500 and the front side surface 611 of the front cover, so as to seal the opening 510 of the case 500. The flexible pad 640 provides a waterproof effect, thereby preventing the moisture from entering the case 500 through the opening 510, and meanwhile improving the electrostatic protection effect.

Figure 13:
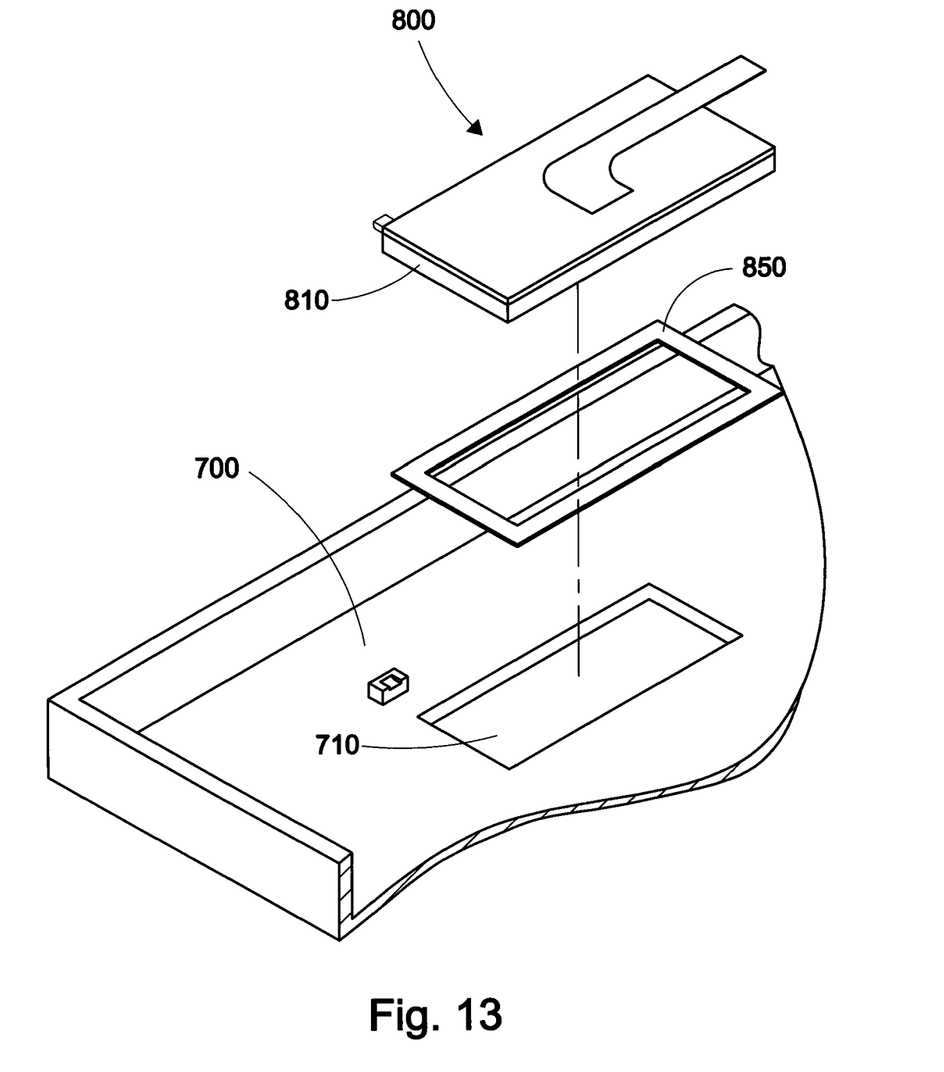
FIG. 13 is a perspective view of an LCD assembly and a case according to the third embodiment of the present invention, in which the LCD assembly is separated from the case.

Referring to FIG. 13, a fixture structure according to a third embodiment of the present invention is shown. The fixture structure includes a case 700 and an LCD assembly 800. The third embodiment is approximately the same as the second embodiment, and the difference there-between lies in that the hooks are omitted in the third embodiment. Meanwhile, the flexible pad 640 in the second embodiment is replaced by a binder 850, such as an adhesive or an adhesive tape, and the binder 850 is disposed on a front side surface of a front cover 810 and surrounds a visible portion. The binder 850 is used for directly binding the front cover to the inner side surface of the case 700, so as to fix the LCD assembly 800 and meanwhile seal the opening 710. The third embodiment aims at illustrating the fact that the LCD assembly 800 may be fixed in the case through various different manners, but not limited to using the screw or the hooks.

In the above embodiments, the lateral wall is monolithically formed on the front cover, so as to wrap an edge of the LCD module. In practice, the lateral wall is divided into a plurality of portions, and the portions are respectively disposed on the front cover and the enclosing member.

Figure 14:
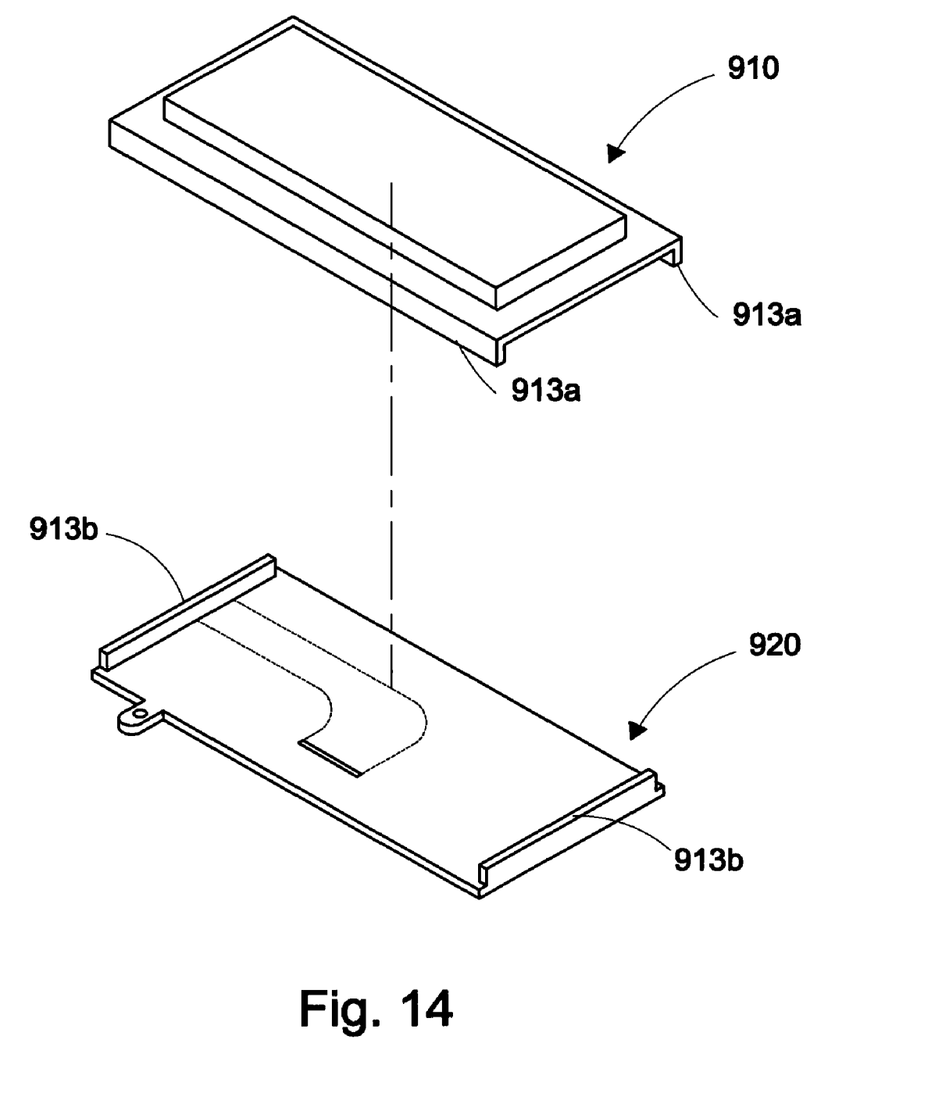
FIG. 14 is an exploded view of a fourth embodiment of the present invention.

Referring to FIG. 14, a fixture component according to a fourth embodiment of the present invention is shown. The fixture component includes a front cover 910 and an enclosing member 920. A lateral wall portion 913a is formed at an edge of a rear side surface of the front cover 910, and a lateral wall portion 913b is formed at an edge of the enclosing member 920, so as to form a complete lateral wall surrounding the rear side surface, thereby wrapping an edge of the LCD module.

While the present invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A fixture component for liquid crystal display module, comprising:
 a front cover, comprising:
  a front side surface, having a visible portion formed on the front side surface in a protrusive manner, and at least the part of the front cover forming the visible portion being transparent; and
  a rear side surface; and
 an enclosing member, combined with the front cover to define a clamping space between the enclosing member and the front cover;
 wherein a cable groove is formed on an outer side surface of the enclosing member.

2. The fixture component as claimed in claim 1, further comprising a lateral wall, formed at an edge of the rear side surface.

3. The fixture component as claimed in claim 1, further comprising a lateral wall with a part of the lateral wall formed at an edge of the rear side surface of the front cover, and the remaining part of the lateral wall formed at an edge of the enclosing member.

4. The fixture component as claimed in claim 1, further comprising at least one lug, disposed at an edge of the enclosing member, and having a through hole.

5. The fixture component as claimed in claim 1, further comprising a binder, disposed on the front side surface and surrounding the visible portion.

6. A liquid crystal display assembly, comprising:
 a liquid crystal display module, having a back side and a display side;
 a front cover, comprising:
  a front side surface, having a visible portion formed on the front side surface in a protrusive manner, and at least the part of the front cover forming the visible portion being transparent;

a rear side surface, with the display side of the liquid crystal display module facing the rear side surface, such that the display side and the front side surface face the same direction, and the visible portion corresponds to the display side; and an enclosing member, combined with the front cover to clamp and wrap the liquid crystal display module between the front cover and the enclosing member;

wherein a cable groove for accommodating a cable is formed on an outer side surface of the enclosing member.

7. The liquid crystal display as claimed in claim 6, further comprising a lateral wall, formed at an edge of the rear side surface, and wrapping an edge of the liquid crystal display module.

8. The liquid crystal display as claimed in claim 6, further comprising a lateral wall, with a part of the lateral wall formed at an edge of the rear side surface of the front cover, and the remaining part of the lateral wall formed at an edge of the enclosing member.

9. The liquid crystal display as claimed in claim 6, further comprising at least one lug, disposed at an edge of the enclosing member, and having a through hole.

10. The liquid crystal display as claimed in claim 6, further comprising a flexible pad, disposed on the front side surface and surrounding the visible portion.

11. A fixture structure for a liquid crystal display module, comprising:
    a case, having an opening;
    a front cover, comprising:
        a front side surface, having a visible portion formed on the front side surface in a protrusive manner and located in the opening, and at least the part of the front cover forming the visible portion being transparent; and
        a rear side surface;
    a liquid crystal module comprising:
        a back side; and
        a display side facing the rear side surface of the front cover, such that the display side and the front side surface face the same direction; and
    an enclosing member, combined with the front cover to clamp and wrap the liquid crystal module between the front cover and the enclosing member;
    wherein the liquid crystal display module further comprises a cable disposed on the back side, and a cable groove for accommodating the cable is formed on an outer side surface of the enclosing member.

12. The fixture structure as claimed in claim 11, further comprising a lateral wall, formed at an edge of the rear side surface, and wrapping an edge of the LCD module.

13. The fixture structure as claimed in claim 11, further comprising a lateral wall having a part of the lateral wall formed at an edge of the rear side surface of the front cover, and the remaining part of the lateral wall formed at an edge of the enclosing member.

14. The fixture structure as claimed in claim 11, further comprising:
    at least one lug, formed at an edge of the enclosing member, and having a through hole;
    a fixing post, disposed on an inner side surface of the case, and having a fixing hole; and
    a fixing member, passing through the through hole and fixed to the fixing hole.

15. The fixture structure as claimed in claim 11, further comprising at least one hook, disposed on an inner side surface of the case, for fixing the enclosing member.

16. The fixture structure as claimed in claim 11, further comprising:
    at least one positioning groove, disposed on an inner side surface of the case; and
    a positioning member, disposed at an edge of the enclosing member, for being inserted into the positioning groove.

17. The fixture structure as claimed in claim 11, wherein the enclosing member has a cable hole for the cable to pass through.

* * * * *